Jan. 4, 1966 P. E. HUMPHREY 3,226,984
FREE GYROSCOPE ELEMENT
Filed April 2, 1962
2 Sheets-Sheet 1

INVENTOR.
PAUL E. HUMPHREY
BY
Knox & Knox

INVENTOR.
PAUL E. HUMPHREY
BY
Knox & Knox

United States Patent Office 3,226,984
Patented Jan. 4, 1966

3,226,984
FREE GYROSCOPE ELEMENT
Paul E. Humphrey, 7665 Central, Lemon Grove, Calif.
Filed Apr. 2, 1962, Ser. No. 184,090
10 Claims. (Cl. 74—5.6)

The present invention relates generally to gyroscopes and more particularly to a free gyroscope element.

The primary object of this invention is to provide a gyroscope having a sensing element freely suspended in a fluid filled shell and driven by fluid friction, there being no mechanical contact between the sensing element and any other part of the structure.

Another object of this invention is to provide a gyroscope wherein the fluid suspended sensing element has a heavy equatorial ring which stabilizes the element in correct neutral position by centrifugal action when the element is rotated and also acts as an indicator or an initiator for pick-off signals which indicate directional changes, and wherein the sensing element may be weighted to orient the spin axis thereof with respect to gravity.

A further object of this invention is to provide a gyroscope of extremely simple structure wherein the shell containing the sensing element is the only moving unit and can be driven directly from a suitable motor rigidly mounted, without complex drive transfer and gimbal means.

Finally, it is an object to provide a gyroscope which is economical to manufacture and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Construction

Figure 1:
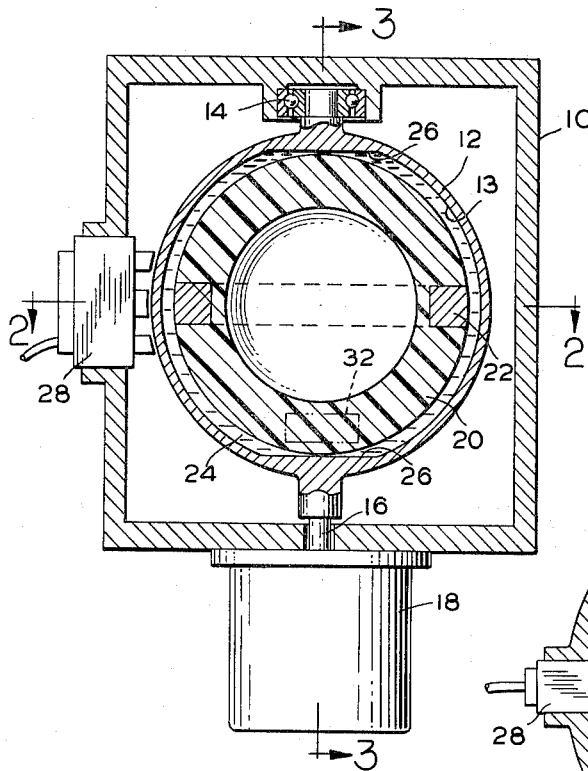
FIGURE 1 is an axial sectional view of the gyroscope assembly.
Figure 2:
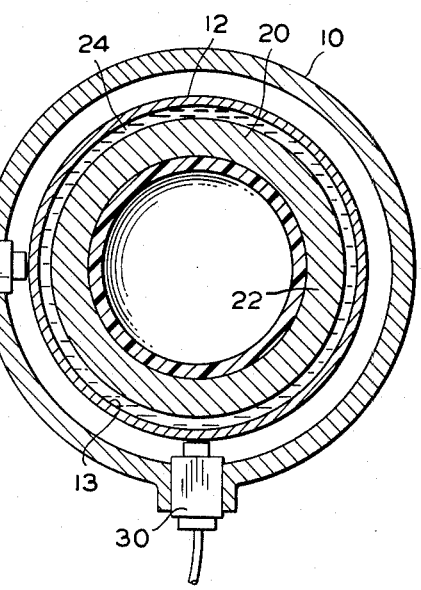
FIGURE 2 is a sectional view taken on line 2—2 of FIGURE 1.
Figure 3:
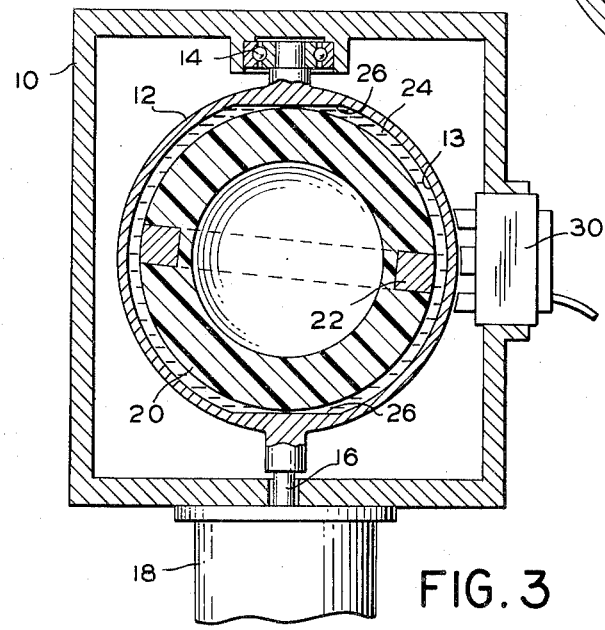
FIGURE 3 is a sectional view taken on line 3—3 of FIGURE 1.

Referring now to FIGURES 1-3 of the drawings, the gyroscope is contained in a rigid frame 10 of any suitable configuration, either an open frame or an enclosed box of cylindrical form as illustrated. Mounted inside frame 10 is a rotatable shell or rotor 12 having a cavity 13 which is round in cross section normal to its spin axis and which may be spherical. This rotor 12 is supported at one end in a bearing 14, the other end being attached to the drive shaft 16 of a motor 18, which is mounted directly on the frame. Any suitable arrangement of bearings and motor connection may be used, that illustrated being simple and practical. Inside the rotor 12 is a lightweight sensing element 20 of a shape corresponding at least generally to the shape of the cavity 13 and preferably only slightly smaller than said cavity. The sensing element 20 may be of any suitable lightweight material including plastic or the like and may be hollow to decrease weight, and is fitted with an equatorial inertia ring 22 of iron or other heavy material. The rotor 12 contains a thin layer of suspension fluid 24 of slightly greater specific gravity than the complete sensing element 20, so that said sensing element is buoyantly suspended. The rotor 12 has flat inner platform faces 26 on the axis of rotation, which reduce the clearance between the rotor wall and sensing element 20 to constitute means to limit axial displacement of the sensing element.

Mounted in the frame 10 adjacent to the inertia ring 22 are two pick-offs 28 and 30 which are circumferentially spaced 90 degrees apart, as in FIGURE 2. The pick-offs are illustrated as of electromagnetic type having multiple heads, but other types may be used.

Operation

The motor 18 spins the rotor 12 axially and the viscous drag of fluid 24 causes the sensing element 20 to take up the rotation. The centrifugal effect of the inertia ring 22 causes the sensing element 20 to assume a stable neutral position with the plane of said inertia ring normal to the axis of rotation, the suspension action of the fluid 24 under rotation and the centrifugal effect tending to hold the sensing element centered in and coaxial with the rotor 12. As a gyroscopic unit, the sensing element 20 tends to remain fixed in space, the effect being well known. Any directional change causes the frame 10 to rotate relative to the sensing element, as in FIGURE 3, and the relative shift of the iron mass is sensed by the electromagnetic pick-offs 28 and 30.

In an installation in an aircraft, the frame 10 would be fixed in the aircraft structure and would move with the aircraft, while the sensing element 20 would remain in its initial position. Thus FIGURE 3 illustrates the relative orientation of the sensing element and frame, rather than the true disposition with the inertia ring 22 horizontal and the frame 10 tilted. The rotor 12 is, of course, made from material which will not interfere with the magnetic field involved in the pick-off system. The translation of the pick-off signals to performance data, corrective signals, or control functions may be performed by any well known system.

While electromagnetic or variable inductance pick-offs are illustrated, it should be understood that other types may be used. Electrostatic, variable capacitance and photoelectric pick-offs have all been used in gyroscope and stable platform applications and this invention is not limited to employment of any one type, the choice being dependent on equipment and services associated with the gyroscope. However, the inertia ring 22, if made from iron, serves the dual purpose of a centrifugal stabilizing mass and an element in the electromagnetic pick-off system.

In normal operation the sensing element 20 will be concentric with the rotor 12 and extremely stable against motion normal to the axis of rotation. Shock or undue acceleration in an axial direction may cause shifting of the sensing element, but this is virtually eliminated by the flat platform faces, which need only have sufficient clearance from the sensing element for a film of fluid 24. Thus false pick-off signals from axial displacement of inertia ring 22 are prevented.

To extend the versatility of the gyroscope unit, a small weight may be imbedded in the lower portion of sensing element 20, as indicated in broken line at 32 in FIGURE 1. This makes the sensing element pendulous and sensitive to gravity as, for example, making it possible to use the unit as a vertical reference.

Figure 4:
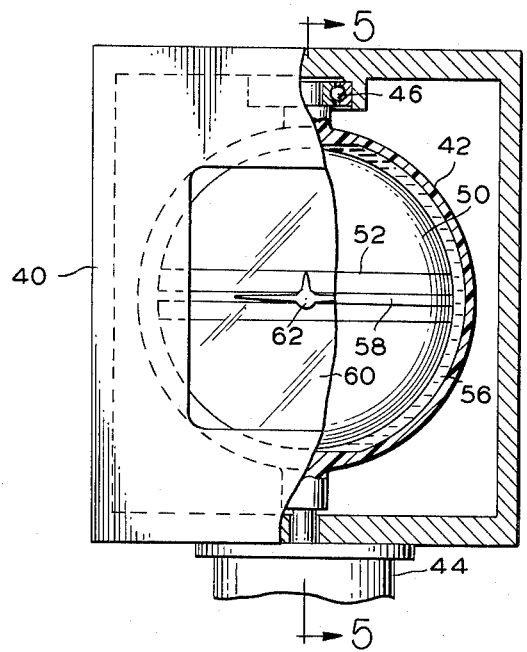
FIGURE 4 is a partially sectional front elevation view of a modified form of the unit.
Figure 5:
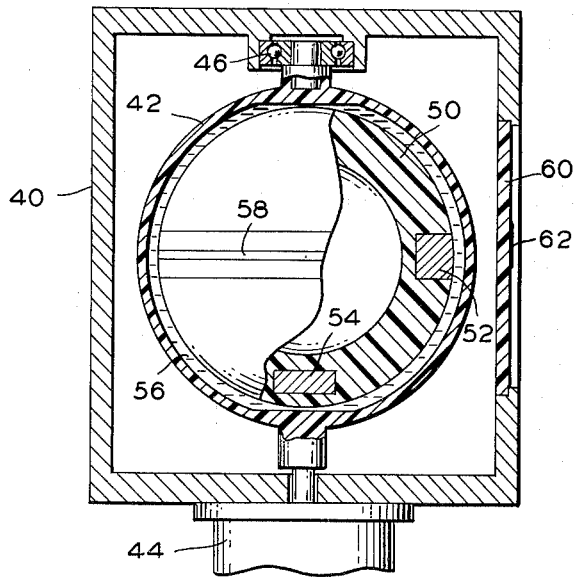
FIGURE 5 is a sectional view taken on line 5—5 of FIGURE 4.

One particularly useful application of the pendulous sensing element is illustrated in FIGURES 4 and 5, which show a unit which will function as an artificial horizon or a turn indicator. The structure is basically similar to that previously described and includes a frame 40 in which is mounted a rotor 42 driven by a motor 44 and supported in a bearing 46. The rotor 42 is a spherical, hollow shell of transparent material and contains a spherical sensing element 50 of light weight material with a heavy equatorial inertia ring 52. The lower portion of the sensing element 50 contains a pendulous weight 54, preferably symmetrical about the axis of rotation for balance, the sensing element being buoyantly suspended in fluid 56. Surrounding the sensing element 50 is an indicating band 58, suitably marked on the center and in the plane of inertia ring 52 for good visibility. One wall of frame 40 is fitted with a transparent window 60 on which is a reference marker 62 of the type used in conventional artificial horizon instruments, the marker being aligned with the indicating band 58 when sensing element 50 is in neutral position, as in FIGURE 4.

With the instrument mounted in an aircraft, for example, any deviation from straight and level flight would result in a shift of the reference marker 62 relative to indicating band 58, the deviation being clearly visible through window 60 and through the transparent rotor 42. Using this visual indication pick-offs are not necessary, but could be used to provide signals to an autopilot, or the like, for corrective action.

In a conventional artificial horizon the equivalent of indicating band 58 is usually carried by a gimballed frame in which is a gyro rotor mounted in bearings and driven by an air turbine, using buckets incorporated in the rotor. The rotor and fluid suspended and driven sensing element illustrated are much simpler and equally effective.

In each configuration described the single, directly driven rotor makes a very simple and compact structure. Since the sensing element has no physical contact with the rotor except through the suspension fluid, manufacturing tolerances are not especially critical compared to some more complex gyroscopes.

It is understood that minor variation from the form of the invention disclosed herein may be made without departure from the spirit and scope of the invention, and that the specification and drawings are to be considered as merely illustrative rather than limiting.

I claim:
1. A gyroscope, comprising:
   a driven, rotatable rotor having a single spin axis;
   a sensing element contained in said rotor and having a substantially equatorial inertia ring of greater density than the body of said sensing element;
   said rotor having a quantity of fluid therein of higher specific gravity than said sensing element and in which the sensing element is buoyantly suspended;
   said fluid representing the only physical connection between said sensing element and said rotor;
   and pick-off means externally of said rotor to detect motion of the plane of said inertia ring relative to the spin axis of the rotor.
2. A gyroscope according to claim 1 wherein said sensing element is weighted so as to orient the spin axis thereof with respect to gravity.
3. A gyroscope, comprising:
   a driven, rotatable rotor having a single spin axis;
   a sensing element contained in said rotor and having a substantially equatorial inertia ring of greater density than the body of said sensing element;
   said rotor having a quantity of fluid therein of higher specific gravity than said sensing element and in which the sensing element is buoyantly suspended;
   said fluid representing the only physical connection between said sensing element and said rotor;
   means to limit the axial motion of said sensing element within said rotor;
   and pick-off means externally of said rotor to detect motion of the plane of said inertia ring relative to the spin axis of the rotor.
4. A gyroscope, comprising:
   a driven, rotatable rotor having a single spin axis and a cavity;
   a spherical sensing element contained in said cavity and having an equatorial inertia ring of greater density than the body of said element;
   said rotor having a quantity of fluid therein of higher specific gravity than said sensing element and in which the sensing element is buoyantly suspended;
   said fluid representing the only physical connection between said sensing element and said rotor;
   and pick-off means externally of said rotor to detect motion of the plane of said inertia ring relative to the spin axis of the rotor.
5. A gyroscope according to claim 4 wherein said pick-off means is magnetic.
6. A gyroscope according to claim 4 wherein said cavity is only slightly larger than said sensing element so there is only a thin layer of said fluid.
7. A gyroscope, comprising:
   a driven, rotatable rotor having a single spin axis and a cavity;
   a spherical sensing element contained in said cavity and having an equatorial inertia ring of greater density than the body of said element;
   said rotor having a quantity of fluid therein of higher specific gravity than said sensing element and in which the sensing element is buoyantly suspended;
   said fluid representing the only physical connection between said sensing element and said rotor;
   said rotor having internal flat faces at both ends on the axis of rotation, the distance between said flat faces being only slightly greater than the diameter of said sensing element and limiting the axial displacement thereof;
   and pick-off means externally of said rotor to detect motion of the plane of said inertia ring relative to the spin axis of the rotor.
8. A gyroscope, comprising:
   a driven rotatable rotor having a single spin axis;
   a sensing element contained in said rotor and having a substantially equatorial inertia ring of greater density than the body of the sensing element;
   said rotor having a quantity of fluid therein of higher specific gravity than said sensing element and in which the sensing element is buoyantly suspended;
   said fluid representing the only physical connection between said sensing element and said rotor;
   and means to indicate motion of the plane of said inertia ring relative to the spin axis of the rotor.
9. A gyroscope, comprising:
   a driven rotatable rotor having a single spin axis;
   a sensing element contained in said rotor and having a substantially equatorial inertia ring of greater density than the body of the sensing element;
   said rotor having a quantity of fluid therein of higher specific gravity than said sensing element and in which the sensing element is buoyantly suspended;
   said fluid representing the only physical connection between said sensing element and said rotor;
   a pendulous weight in said sensing element at the lower end of the spin axis thereof;
   and means to indicate motion of the plane of said inertia ring relative to the spin axis of the rotor.
10. A gyroscope, comprising:
   a driven rotatable rotor having a single spin axis;
   a sensing element contained in said rotor and having a substantially equatorial inertia ring of greater density than the body of the sensing element;
   said rotor having a quantity of fluid therein of higher specific gravity than said sensing element and in which the sensing element is buoyantly suspended;
   said fluid representing the only physical connection between said sensing element and said rotor;

a pendulous weight in said sensing element at the lower end of the spin axis thereof;

said rotor being transparent;

said sensing element having an equatorial indicating band marked thereon in the plane of said inertia ring;

and a reference element mounted externally of said rotor and fixed relative to the spin axis thereof, whereby motion of the plane of said inertia ring relative to the rotor spin axis is visually indicated.

References Cited by the Examiner
UNITED STATES PATENTS

| | | | |
|---|---|---|---|
| 1,986,807 | 1/1935 | Gillmor | 74—5.7 X |
| 2,377,175 | 5/1945 | Peer | 74—5 X |
| 2,809,527 | 10/1957 | Annen | 74—5.7 |
| 2,871,706 | 2/1959 | Fischer et al. | 74—5.7 |
| 3,044,309 | 7/1962 | Buchhold | 74—5.7 X |

BROUGHTON G. DURHAM, *Primary Examiner.*

K. DOOD, P. W. SULLIVAN, *Assistant Examiners.*